Aug. 9, 1966     D. J. NAHIGIAN     3,264,775

FISH LURE

Filed Oct. 2, 1964

INVENTOR.
DAVID J. NAHIGIAN
BY
William Frederick Werner
ATTORNEY

United States Patent Office 3,264,775
Patented August 9, 1966

3,264,775
FISH LURE
David J. Nahigian, 179 Nagansett Ave., Warwick, R.I.
Filed Oct. 2, 1964, Ser. No. 401,052
4 Claims. (Cl. 43—42.39)

This invention relates to fish lures and more particularly to lures constructed to effect a wobbling action from side to side and a concentrated weight to permit bullet type casting into the wind.

An object of the present invention is to provide a fish lure in which the floating depth is determined by the rate of speed of trolling or retrieving.

Another object of the present invention is to provide a fish lure with a shape whereby it will always float in a predetermined position when trolling or retrieving.

A further object of the present invention is to provide an artificial fish bait wherein the construction enhances the effectiveness of the lure in attracting fish to a hook.

And still a further object of the present invention is to provide in a manner as hereinafter set forth, a fish lure which is simple in construction and arrangement, strong, durable, compact, thoroughly efficient in the use intended therefor, and of a form providing a motion to attract fish and conveniently installed with respect to a fishing line, a leader or hook, and in expensive to manufacture.

Other objects of the present invention will be pointed out in part and become apparent in part in the following specification and claims.

Referring to the drawings in which similar characters of reference indicate corresponding parts in all the figures.

Figure 1:
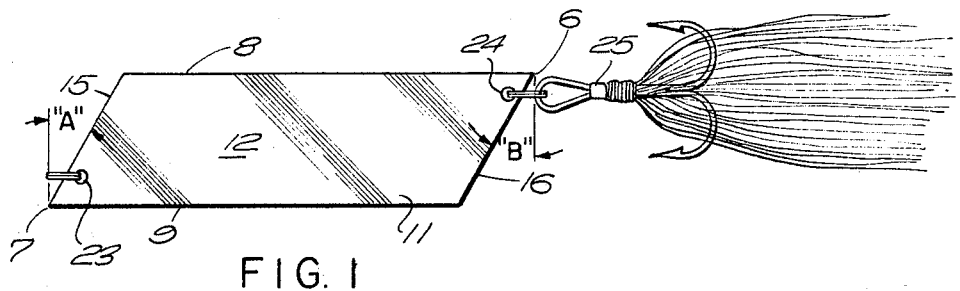
FIGURE 1 is a plan view of the new and improved fish lure.
Figure 2:
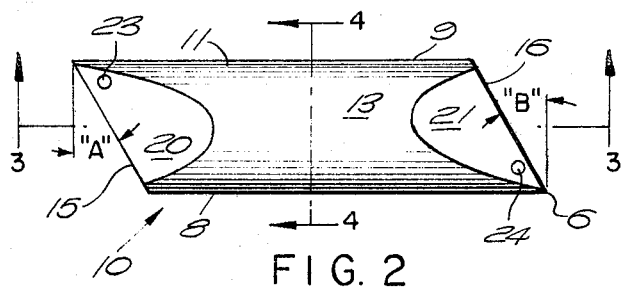
FIGURE 2 is a bottom plan view of figure.
Figure 3:
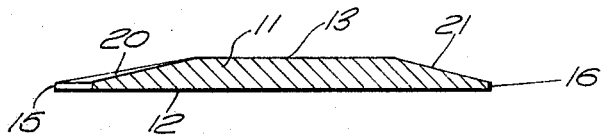
FIGURE 3 is a longitudinal vertical view taken on line 3—3 of FIGURE 2.
Figure 4:
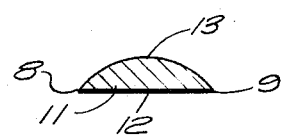
FIGURE 4 is a transverse vertical view taken on line 4—4 of FIGURE 2.
Figure 5:
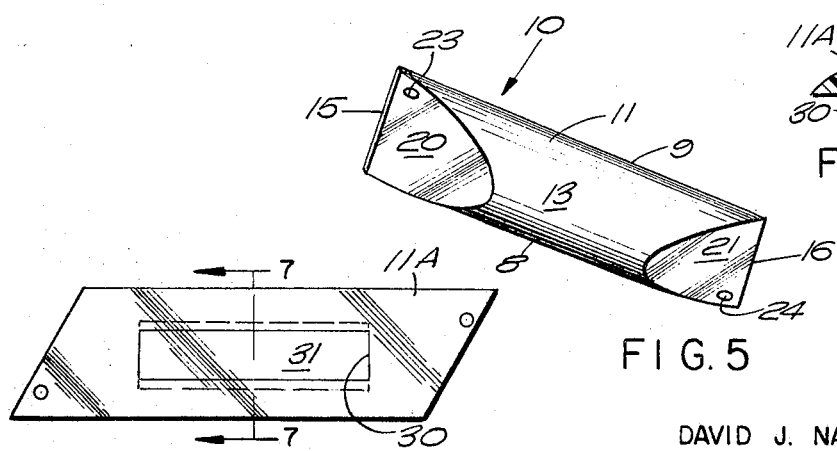
FIGURE 5 is a perspective view of the new and improved fish lure.

In these views, reference character 10, generally indicates the new and improved fish lure consisting of an elongated body 11, having a flat surface 12 and an opposite keel surface 13.

Elongated body 11 is illustrated as having the geometric form of a general rhomboidal shape wherein sides 8, 9 are substantially parallel and front and rear ends 15, 16, respectively, are substantially parallel to each other. It should be borne in mind that sides 8 and 9 may taper toward front end 15 or toward rear end 16 and still come within the purview of the present invention.

Front end 15 is illustrated as forming angle A with side 9 whereby corner 7 becomes the leading edge 7. Rear end 16 is illustrated as forming angle B with side 8 whereby corner 6 becomes the trailing edge 6. Angles A and B may vary within the limits which will hereinafter appear. They are illustrated as approximating twenty-five degrees. Keel surface 13 is illustrated as half round. However, any other geometric shape which depends from flat surface 12 and can be fabricated with the functional surfaces hereinafter described, will provide the necessary form.

Keel surface 13 is provided with oppositely located beveled areas 20, 21 which are so fabricated to give thickness to front and rear ends 15, 16, respectively, for reasons which will presently appear.

An orifice 23 is located in corner 7 and an orifice 24 is located in corner 6.

Orifice 23 is an eye for a retrieving line and orifice 24 is an eye for a dressed hook 25 as shown or for the attachment of a plain hook or hook leader.

Body 11 is preferably made from bronze, brass or stainless steel so that it consists of a concentrated weight which may be cast into the wind unaffected by the force of the wind.

In operation as the fish lure 10 is cast into the water and the retrieving action is started the body 11 turns so that the flat surface 12 tends to assume an uppermost position with keel surrface 13 tending to maintain the flat surface 12 in a generally horizontal position.

The speed of the retrieving action will determine the depth at which body 11 floats.

The rush of water striking end 15 will cause the fish lure 10 to move from side to side or in a wobbling action. That is, front end 15 will swing in relation to back end 16 and the lure will roll slightly as side 8 rises and falls in relation to side 9. Lure 10, however, will never rotate or spin. That is, sides 8 and 9 will never move in a complete circle.

If front edge 15 forms a right angle with sides 8 and 9 the side action of lure 10 is negligible. As angle A increases and front end 15 moves rearwardly from the perpendicular the side to side action increases until the action becomes excessively erratic. This action may be rephrased to state that the angle of the front end 15 offers resistance to the water during trolling or retrieving. To change the angle is to change the resistance and the resulting wobbling action.

The thickness of front end 15 also offers resistance to the water. The greater the thickness the greater the resistance until excessive resistance causes the lure to dive or sound. Therefore beveled area 20 is provided to limit the thickness of front end 15 and to provide a water ski surface or a surface which will force the front end 15 to lift upwardly as the water passes across beveled area 20.

The back beveled area 21 causes the rush of water to strike the tail hook or dressed hook 25. The dressed hook 25 will therefore acquire a side to side motion so as to further assist in the side to side or wobbly motion of the body 11.

Fish lure 10 is therefore constructed to swim during trolling or retrieving in a somewhat upright but wobbly position to provide a teasing motion which will attract fish.

Figure 7:
FIGURE 7 is a transverse vertical view taken on line 7—7 of FIGURE 6.
Figure 6:
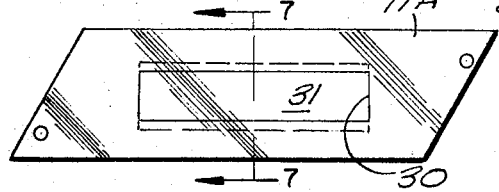
FIGURE 6 is a view similar to FIGURE 1 showing a modified form of fish lure.

FIGURES 6 and 7 illustrate a plastic elongated body 11A which is hollowed out at 30 and filled in with lead 31 to weight the body 11A. The plastic has the advantage of providing a variety of colored elongated bodies 11A. Obviously any other heavy material may be substituted for lead. The plastic elongated body 11A may be solid plastic and provided with a plurality of hollow areas which may be filled with lead or other heavy metal so as to add weight to plastic body 11A.

Having shown and described preferred embodiments of the present invention by way of example, it should be realized that structural changes could be made and other examples given without departing from either the spirit or scope of this invention.

What I claim is:
1. A fish lure comprising an elongated body provided with opposite sides and having a flat surface, an opposite keel surface, a front end positioned at an angle to said opposite sides and a back end generally parallel to said front end, said front end providing a leading corner with one of said opposite sides, said back end providing an oppositely located trailing corner with the other of said opposite sides, a beveled area in said keel surface forming a thickness in said front end, a second beveled area in said keel surface forming a thickness in said back end, and means located in said leading corner for attaching a fish line, and means located in said trailing corner for attaching a fish hook, thereto.

2. A fish lure comprising an elongated body having a general rhomboidal shape provided with generally parallel sides and generally parallel front and back ends located at acute angles, respectively, to opposite parallel sides, and a generally flat surface and an opposite keel surface generally half round in transverse vertical cross section, the acute angle of said front end providing a leading edge, the acute angle of said back edge providing a trailing edge, a beveled area in said keel surface forming a preselected thickness in said front end, a second beveled area in said keel surface forming a preselected thickness in said back end, means located in said leading edge for attaching a fish line, and means located in said trailing edge for attaching a fish hook, thereto.

3. A fish lure comprising a single piece of material forming an elongated body provided with opposite sides and having a generally flat surface, an opposite keel surface, a front end positioned at an angle to said opposite sides, and a back end, said front end providing a leading corner at one of said opposite sides, said back end providing a trailing corner with the other of said opposite sides, tapered means in said keel surface forming a predetermined thickness in said front end, a second tapered means in said keel surface forming a predetermined thickness in said back end, means located in said leading corner providing a retrieving eye and means located in said trailing corner providing an eye for attachment of a hook.

4. A fish lure comprising an elongated hollow body fabricated from plastic material and provided with opposite sides, a flat surface, an opposite keel surface, a front end positioned at an angle to said opposite sides and a back end generally parallel to said front end, said front end providing a leading corner with one of said opposite sides, said back end providing an oppositely located trailing corner with the other of said opposite sides, a beveled area in said keel surface forming a thickness in said front end, a second beveled area in said keel surface forming a thickness in said back end, means located in said leading corner providing a retrieving eye, means located in said trailing corner providing an eye for attachment of a hook and a filler of metal, means securing said filler of metal in said elongated hollow body.

References Cited by the Examiner
UNITED STATES PATENTS

| | | | |
|---|---|---|---|
| 1,394,313 | 10/1921 | Leeper | 43—42.39 X |
| 1,568,325 | 1/1926 | Dewey | 43—42.28 X |
| 1,813,843 | 7/1931 | Flood | 43—42.48 X |
| 2,165,734 | 7/1939 | Stracener | 43—42.39 X |
| 2,641,862 | 6/1953 | Poe. | |
| 2,817,922 | 12/1957 | Takeshita | 43—42.28 |

SAMUEL KOREN, *Primary Examiner.*

D. J. LEACH, *Assistant Examiner.*